United States Patent [19]

Suzuki et al.

[11] Patent Number: 5,314,388
[45] Date of Patent: May 24, 1994

[54] OIL-OPERATED TENSIONER WITH AIR BLEEDING MECHANISM

[75] Inventors: Tadasu Suzuki, Chicopee, Mass.; Kiyotaka Sakamoto, Hanno, Japan

[73] Assignee: Tsubakimoto Chain Co., Osaka, Japan

[21] Appl. No.: 74,783

[22] Filed: Jun. 10, 1993

[30] Foreign Application Priority Data

Jun. 10, 1992 [JP] Japan .............................. 4-046124[U]

[51] Int. Cl.⁵ .............................................. F16H 7/08
[52] U.S. Cl. .................................................. 474/110
[58] Field of Search ........................ 474/101, 109–111, 474/113–117, 133–138

[56] References Cited

U.S. PATENT DOCUMENTS

| | | |
|---|---|---|
| 4,504,251 | 3/1985 | Mittermeier ......................... 474/110 |
| 4,507,103 | 3/1985 | Mittermeier . | |
| 4,881,927 | 11/1989 | Suzuki . | |
| 5,087,225 | 2/1992 | Futami et al. .................. 474/110 X |
| 5,234,383 | 8/1993 | Harada et al. ...................... 474/110 |

Primary Examiner—Thuy M. Bui
Attorney, Agent, or Firm—Howson & Howson

[57] ABSTRACT

In an oil-operated tensioner for applying tension to a power-transmitting chain, a ball check valve is positioned above the oil chamber, either in the tensioner housing, or in the plunger. The ball of the check valve can oscillate when air is present in the oil chamber, since air is compressible. Oscillation of the ball, which occurs when the plunger oscillates during operation of the tensioner, allows the residual air to be discharged from the oil chamber. However, after the air is discharged, oscillation of the plunger is restrained by the incompressibility of the oil, and oscillation of the ball is restrained by the viscosity of the oil which then surrounds the ball. The valve seat of the check valve preferably opens upwardly so that oil splash is accumulated in the valve seat to prevent entry of air through the check valve upon sudden projecting movement of the plunger.

4 Claims, 3 Drawing Sheets

OIL-OPERATED TENSIONER WITH AIR BLEEDING MECHANISM

BRIEF SUMMARY OF THE INVENTION

This invention relates to tensioners, and more particularly to improvements in an oil-operated tensioner of the kind used to maintain tension in the timing chain of an internal combustion engine.

A typical oil-operated tensioner for imparting a proper tension to a chain comprises a hollow housing, a plunger slidable in the housing and, together with the housing, forming an oil chamber of variable volume. A passage, leading from the exterior of the housing to the oil chamber, is provided for delivery of oil to the chamber, and a check valve is provided for allowing inward flow of oil toward the oil chamber, but preventing outward flow of oil.

The plunger of the tensioner is arranged to urge a tensioner shoe against a drive chain wound around two or more sprockets, in order to maintain tension in the chain. The plunger is typically urged outwardly, i.e. in a protruding direction, by a coil spring, and is able to move rapidly in the protruding direction. However, retracting movement of the plunger requires oil to flow through a restriction, so that retracting movement of the plunger takes place more slowly than its protruding movement.

Residual air present in the oil chamber of the tensioner, will cause the operation of the tensioner to deteriorate because of the compressibility of the air. Therefore, a mechanism for removing the residual air from the oil chamber is required.

In a typical conventional tensioner, air is discharged through a long, restricted passage, typically provided by fine helical threads formed on the exterior of a plug which is press fit in a hole formed in the housing of the tensioner. Residual air in the oil chamber is discharged to the exterior of the tensioner through the restricted passage.

In the conventional tensioner described above, as residual air is discharged through the restricted passage, oil is also discharged along with the air. As a result, oil leakage occurs. Furthermore, unless the oil is replenished, the tensioner will eventually become unable to impart proper tension to the chain.

It is therefore an object of this invention to provide an improved tensioner capable of discharging residual air from inside the oil chamber, without the loss of oil.

The improved oil-operated tensioner in accordance with the invention comprises a hollow housing and a plunger slidable in the hollow housing. The plunger and housing, together, form an oil chamber. An oil passage, formed in the housing, extends from the exterior thereof to the oil chamber. A first ball check valve, located between the oil passage and the oil chamber, allows flow of oil through the oil passage into the oil chamber but checks flow of oil through the passage out of the oil chamber. A second ball check valve checks oil flow outwardly from the oil chamber, and is mounted in a position above the oil chamber, so that oscillation of the tensioner, permitted by the presence of air along with the oil in the oil chamber, and resulting oscillatory opening and closing of the second ball check valve, permit the release of air through the second ball check valve to the exterior of the oil chamber without substantial escape of oil from the oil chamber.

In the operation of the tensioner, the plunger is engaged with a tensioner shoe through which tension is applied to a chain. Oil is supplied, by an external source of oil under pressure, to the oil chamber through the oil passage by way of the first ball check valve. The oil includes some air. This air accumulates in the upper part of the oil chamber.

As the chain rotates, the tension of the chain exerts a force on the plunger. This force changes with variations in chain tension. Since the air, which accumulates in the upper part of the oil chamber, is a compressible fluid, the plunger of the tensioner oscillates back and forth, being influenced by the pressure of the accumulated air. As the plunger oscillates, the tension in the chain also oscillates. The oscillation of the tension in the chain allows the plunger to oscillate in such a way that the ball of the second check valve moves away from its seat in an oscillatory motion, thereby discharging the air from the interior of the oil chamber.

After the accumulated air is discharged, the oscillation of the plunger is restrained, and the second ball check valve ceases to oscillate. After the air is discharged, the oil in the oil chamber of the tensioner surrounds the ball of the second ball check valve, enhancing its ability to provide a seal against the outward flow of oil.

Preferably, the second ball check valve is provided with a ball seat having an opening which opens upward. In this case, when the tensioner is used in an environment in which oil is splashed, for example within the timing chain cover of an internal combustion engine, the splashed oil enters the opening of the ball seat and remains in the ball seat. If the chain tension suddenly decreases to allow abrupt projecting movement of the plunger, the second ball check valve is likely to open. However, the oil present in the ball seat prevents air from entering the oil chamber through the second check valve.

Further objects, advantages and details of the invention will become apparent from the following detailed description, when read in conjunction with the drawings.

DETAILED DESCRIPTION

Figure 4:
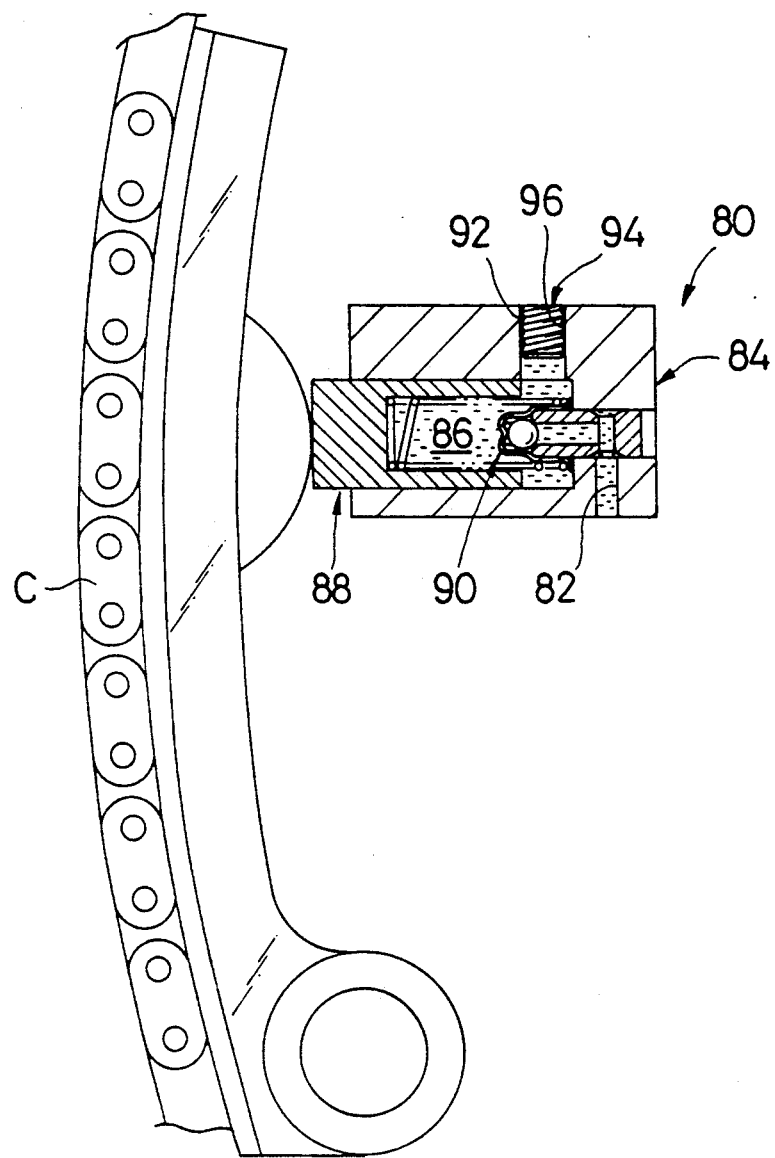
FIG. 4 is a sectional view of a typical oil-operated tensioner of the prior art.

FIG. 4 shows a conventional oil-operated tensioner 80 for imparting tension to a chain. The tensioner 80 comprises a hollow housing 84 having a plunger 88 slidable in the housing and forming an oil chamber 86. An oil passage 82 is formed in the housing to supply oil from the exterior of the housing to the oil chamber 86. A ball check valve 90 is provided between the oil passage 82 and the oil chamber 86. In order to remove residual air from the oil chamber 86, and thereby prevent deterioration in the performance of the tensioner, the tensioner is provided with a plug 94, press fit into a hole 96 formed in housing 84. The exterior of the plug has helical threads which, together with the wall of hole 96, form an elongated, restricted helical passage 92 for the discharge of air from oil chamber 86 to the exterior of the tensioner. As stated previously, in the conventional tensioner, as residual air is discharged through the restricted passage, oil is also discharged along with the air. The improved oil-operated tensioner 10, depicted in FIGS. 1 and 2, comprises a hollow housing 14 and a plunger 18 slidable in the hollow housing 14, and, together with the housing, forming an oil chamber 16. An oil passage 12 is formed in the housing for the entry of oil into the oil chamber. The oil is supplied from an external oil pressure source (not illustrated) such as an oil pump. A ball check valve 20 is provided between the oil passage 12 and the oil chamber 16. Check valve 20 has a ball seat 21, a retainer 22, a ball 23, and a weak spring 24 arranged to urge the ball against the seat. A spring 26 is installed inside the oil chamber. The plunger 18 is urged in the protruding direction both by oil pressure and by the pressure exerted on it by spring 26.

A second ball check valve 30 is mounted in housing 14, and is positioned with respect to the oil chamber so that, when the tensioner housing is mounted on an engine or other machine in a specific position, the valve 30 is located above the oil chamber. The second check valve 30 comprises a ball seat 31, a ball 33, and a weak spring 34 urging the ball toward the seat. It functions to check the flow of oil from the oil chamber 16 toward the exterior of the tensioner. The ball seat 31 is a cylindrical seat with an opening 36 which preferably opens upward in order to collect oil splash.

Figure 1:
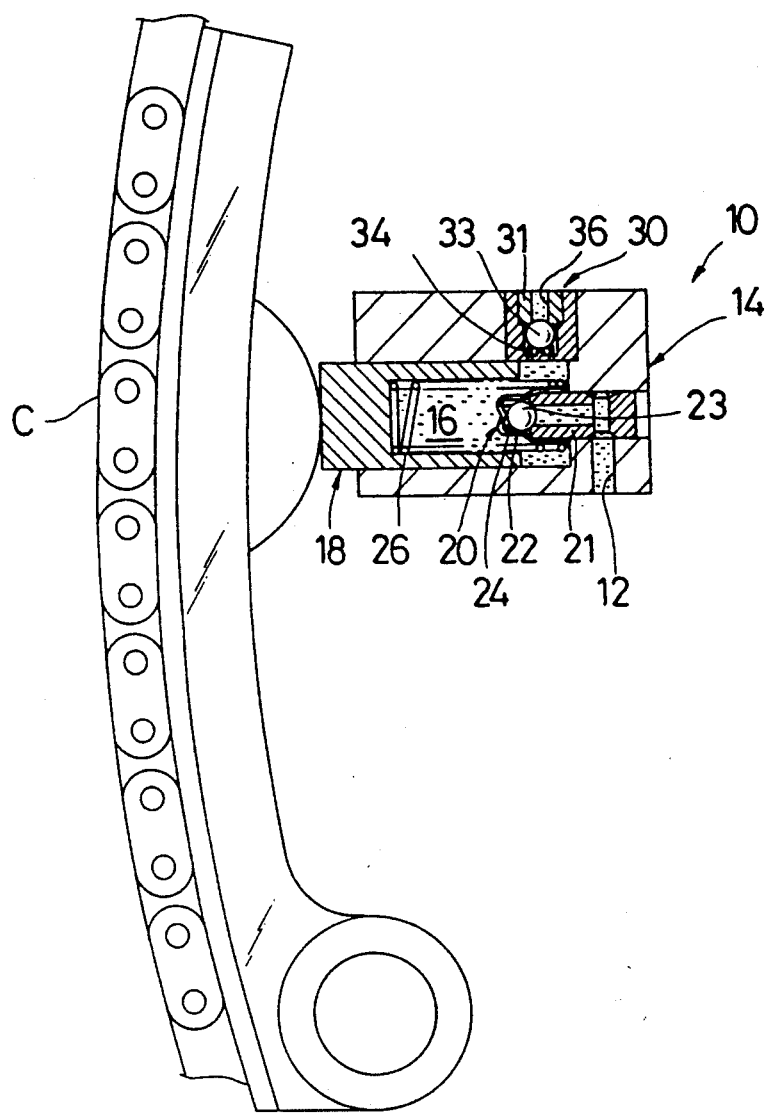
FIG. 1 is a sectional view showing an oil-operated tensioner according to a first embodiment of the invention.
Figure 2:
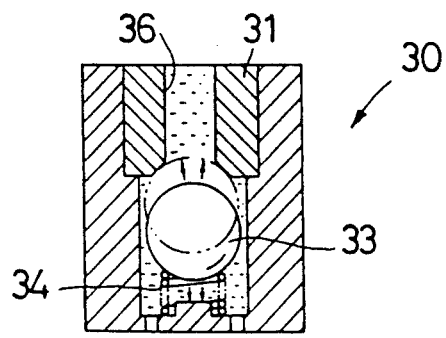
FIG. 2 is an enlarged sectional view of a second ball check valve of the tensioner of FIG. 1, showing the behavior of the ball when residual air is present in the oil chamber.

In the operation of the tensioner of FIGS. 1 and 2, a small quantity of air, which is introduced into the oil chamber along with oil from the external oil pump, gathers in the upper part of the oil chamber 16. The compressibility of the residual air in oil chamber 16 allows plunger 18 to oscillate when a force is applied to it by chain C. When the plunger 18 oscillates, the tensioner 10 itself also oscillates.

When the plunger 18 oscillates, and the tensioner 10 itself also oscillates, ball 33 moves off the ball seat 31 in an oscillating motion, being held thereon only by a weak spring 34. This allows the residual air in the upper part of the oil chamber 16 to escape to the exterior of the tensioner.

After the residual air is discharged from the oil chamber 16, oscillation of plunger 18 is restrained, because the oil chamber is then filled with oil, which is substantially incompressible. After the discharge of the residual air, the oil will surround ball 33, and consequently, oscillation of ball 33 becomes more difficult due to the viscosity of the oil. The presence of oil surrounding ball 33 also improves the sealing properties of check valve 30.

Figure 3:
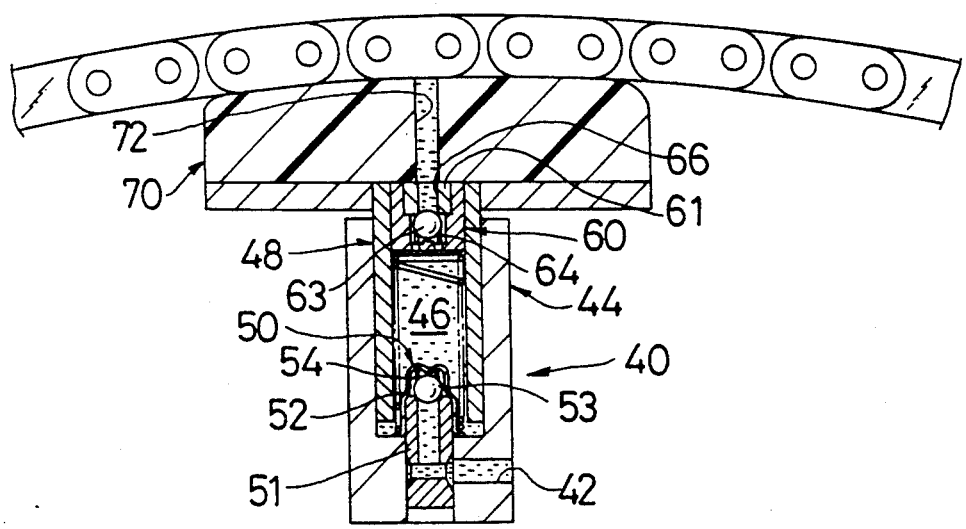
FIG. 3 is a sectional view showing an oil-operated tensioner according to a second embodiment of the invention.

In the second embodiment of the invention, as shown in FIG. 3, an oil-operated tensioner 40 comprises a hollow housing 44 and a plunger 48 slidable in the housing 44. The housing and plunger together define an oil chamber 46. An oil passage 42 leads from the exterior of the housing to the oil chamber, and a ball check valve 50 is provided between the oil passage 42 and the oil chamber 46. Valve 50 comprises a ball seat 51, a retainer 52, a ball 53, and a weak spring 54 urging the ball toward the seat. As in the case of the tensioner of FIG. 1, oil is supplied from an external oil pressure source (not illustrated) such as an oil pump. A spring 56, disposed in the oil chamber 46, urges the plunger 48 in the projecting direction. Thus, the plunger is urged in the projecting direction both by the spring and by the pressure of the oil supplied by the external oil pressure source.

The plunger 18 has a second ball check valve 60 located inside its forward end. The second ball check valve 60 comprises a ball seat 61, a ball 63, and a weak spring 64 urging the ball toward the seat. Valve 60 checks the flow of oil outward from the oil chamber 46. The ball seat 61 is cylindrical in shape and has an opening 66 which opens upward.

The oil-operated tensioner is further provided with a tensioner shoe 70 fixedly mounted outside the tensioner, on the forward end of plunger 48. The tensioner shoe 70 is provided with a central hole 72 communicating with opening 66 of the ball seat 61. Thus, opening 66 and hole 72 together provide a reservoir for oil accumulated as a result of oil splash.

The oil-operated tensioner 40 has the advantage that it is of a compact construction, since the second check ball valve 60 is included as a part of plunger 48.

In the tensioner of this invention, when residual air is present in the oil chamber, the plunger is easily movable backward and forward, and therefore the tensioner itself oscillates. Oscillation of the tensioner is accompanied by the oscillation of the ball of the second check ball valve. The air accumulated in the upper part of the oil chamber is discharged by the second check ball valve as the ball oscillates. When substantially all of the residual air is discharged from the oil chamber, the oscillation of the plunger is restrained, and accordingly, the oscillation of the tensioner itself and of the ball of the second check ball valve are also restrained. Furthermore, when the residual air is discharged, oil surrounds the ball of the second check valve, and, by virtue of its viscosity, improves the sealing capability of the second check valve. By virtue of the above-described operation of the second check valve, the tensioner discharges only residual air, without discharging oil. Consequently, the tensioner is able to apply proper tension to a circulating chain without leakage of oil through the air discharge path, and without deterioration in its performance over time.

In the preferred embodiment of the invention, when the tensioner is situated in an environment in which oil is splashed, oil flows into the upwardly directed opening of the ball seat of the second check valve. In this embodiment, the presence of oil in the valve seat prevents air from being drawn into the oil chamber if the second check valve opens as a result of a sudden projecting movement of the plunger.

As will be apparent from the foregoing description, the advantages of the invention can be realized in an oil-operated tensioner in which the air discharge check valve is situated in the tensioner housing, and also in a tensioner in which the air discharge check valve is situated in the plunger. The invention is applicable to tensioners in which the force urging the plunger in the projecting direction is exerted by a spring, by oil pressure, or by both a spring and oil pressure in combination. Various modifications can be made to the tensioners described herein without departing from the scope of the invention as defined in the following claims.

We claim:
1. An oil-operated tensioner comprising:
   means providing a hollow housing having an interior and an exterior;

means providing a plunger slidable in the interior of the hollow housing and, together with the housing-providing means, forming an oil chamber;

an oil passage formed in said housing extending from the exterior thereof to the oil chamber;

means comprising a first ball check valve, located between the oil passage and the oil chamber, for allowing flow of oil through the oil passage into the oil chamber but checking flow of oil through the oil passage out of the oil chamber;

means comprising a second ball check valve for checking oil flow outwardly from the oil chamber, the second ball check valve being mounted in a position above the oil chamber, whereby oscillation of the tensioner, permitted by the presence of air along with oil in the oil chamber, and resulting oscillatory opening and closing of the second ball check valve, permit the release of air through the second ball check valve to the exterior of said oil chamber without substantial escape of oil from the oil chamber.

2. An oil-operated tensioner as claimed in claim 1, including spring means, mounted in the oil chamber, for urging the plunger in a protruding direction outwardly with respect to the housing.

3. An oil-operated tensioner as claimed in claim 1, wherein the second ball check valve has a ball seat having an opening which opens upward.

4. An oil-operated tensioner as claimed in claim 3, including spring means, mounted in the oil chamber, for urging the plunger in a protruding direction outwardly with respect to the housing.

* * * * *